United States Patent
Matsuoka et al.

(10) Patent No.: US 6,590,628 B2
(45) Date of Patent: Jul. 8, 2003

(54) LIQUID CRYSTAL DISPLAY DEVICE WITH ORIENTATION CONTROL WINDOW

(75) Inventors: Hideki Matsuoka, Gifu (JP); Yoshiki Tanaka, Gifu-ken (JP); Masashi Mitsui, Gifu-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 156 days.

(21) Appl. No.: 09/946,302

(22) Filed: Sep. 4, 2001

(65) Prior Publication Data

US 2002/0027633 A1 Mar. 7, 2002

(30) Foreign Application Priority Data

Sep. 5, 2000 (JP) .......................... 2000-268142

(51) Int. Cl.[7] ...................... G02F 1/1343; G02F 1/1337
(52) U.S. Cl. ...................... 349/139; 349/143; 349/178; 349/130
(58) Field of Search ................ 349/130, 139, 349/143, 144, 178

(56) References Cited

U.S. PATENT DOCUMENTS

| | | | |
|---|---|---|---|
| 6,115,100 A | * | 9/2000 | Koma .................. 349/181 |
| 6,215,542 B1 | * | 4/2001 | Lee et al. .................. 349/143 |
| 6,229,589 B1 | * | 5/2001 | Koma .................. 349/139 |
| 6,509,944 B2 | * | 1/2003 | Koma et al. .................. 349/139 |

* cited by examiner

Primary Examiner—Robert H. Kim
Assistant Examiner—Tai Duong
(74) Attorney, Agent, or Firm—Hogan & Hartson, LLP

(57) ABSTRACT

The response speed of liquid crystal is enhanced by reducing a distance d between a longer side (42) of a display electrode and a linear portion (51) of an orientation control window (50). On the other hand, a larger orientation control window (50) (corresponding to a smaller distance d) results in undesirable decrease in contrast of the liquid crystal. Further, the effect of increase in response speed is diminished when the distance d is smaller than the range of 25 μm to 30 μm. Therefore, the distance d is preferably in the range of 25 μm to 30 μm, and the window (50) preferably has a width of 7 μm. An LCD configured to satisfy the above conditions allows improvement in contrast and response speed.

15 Claims, 6 Drawing Sheets

LIQUID CRYSTAL DISPLAY DEVICE WITH ORIENTATION CONTROL WINDOW

BACKGROUND OF THE INVENTION

1. Field of the Invention

The present invention relates to a liquid crystal display device (LCD) for displaying images utilizing electrooptic anisotropy of liquid crystal, and more particularly to a configuration of an electrode thereof.

2. Description of the Related Art

LCDs are compact, thin, and low power consumption devices, and have therefore been developed for practical use in the field of office automation (OA) equipment, audio-visual (AV) equipment, and others. In particular, an active matrix LCD having a thin film transistor (hereinafter referred to as a TFT) as a switching element is theoretically capable of static actuation with a 100% duty cycle in a multiplexed manner, and is therefore applied to a large screen for displaying motion pictures with a high resolution.

A liquid crystal layer is sandwiched between a common electrode shared by a plurality of pixels and a display electrode driven by a TFT. A region where one display electrode is formed corresponds to each pixel area, and a slit is formed in the common electrode corresponding to each pixel. Such a slit is called an orientation control window for maintaining a constant direction of inclination of liquid crystal molecules. The orientation control window may be composed of, for example, a linear slit and a V-shaped slit coupled to and branched from each end of the linear slit.

The shape of the orientation control window de scribed above, and arrangement thereof with respect to the display electrode, must be determined taking into consideration the aperture ratio, response speed, and the like.

SUMMARY OF THE INVENTION

An object of the present invention is to achieve appropriate arrangement of the orientation control window and the display electrode.

In order to accomplish the above object, a liquid crystal display device according to the present invention has a distance or spacing in the range between 25 μm and 30 μm at the most between an orientation control window and a display electrode on a display plane. Although the response speed tends to increase with a decrease in the above distance when the distance is 30 μm or longer, it has been proved that the response speed shows substantially no change when the distance is 30 μm or shorter, especially shorter than 25 μm. On the other hand, a smaller distance results in a reduction in displayable area per pixel, which is likely to cause decreases in aperture ratio and contrast. Consequently, the above distance is preferably 30 μm or smaller, and is more preferably in the neighborhood of 30 μM. The orientation control window is preferably about 7 μm.

Thus, the present invention provides a liquid crystal display device with increased area where the orientation of liquid crystal molecules can be controlled, i.e. with increased contrast of pixels and enhanced response speed.

DESCRIPTION OF THE PREFERRED EMBODIMENT

Figure 1:
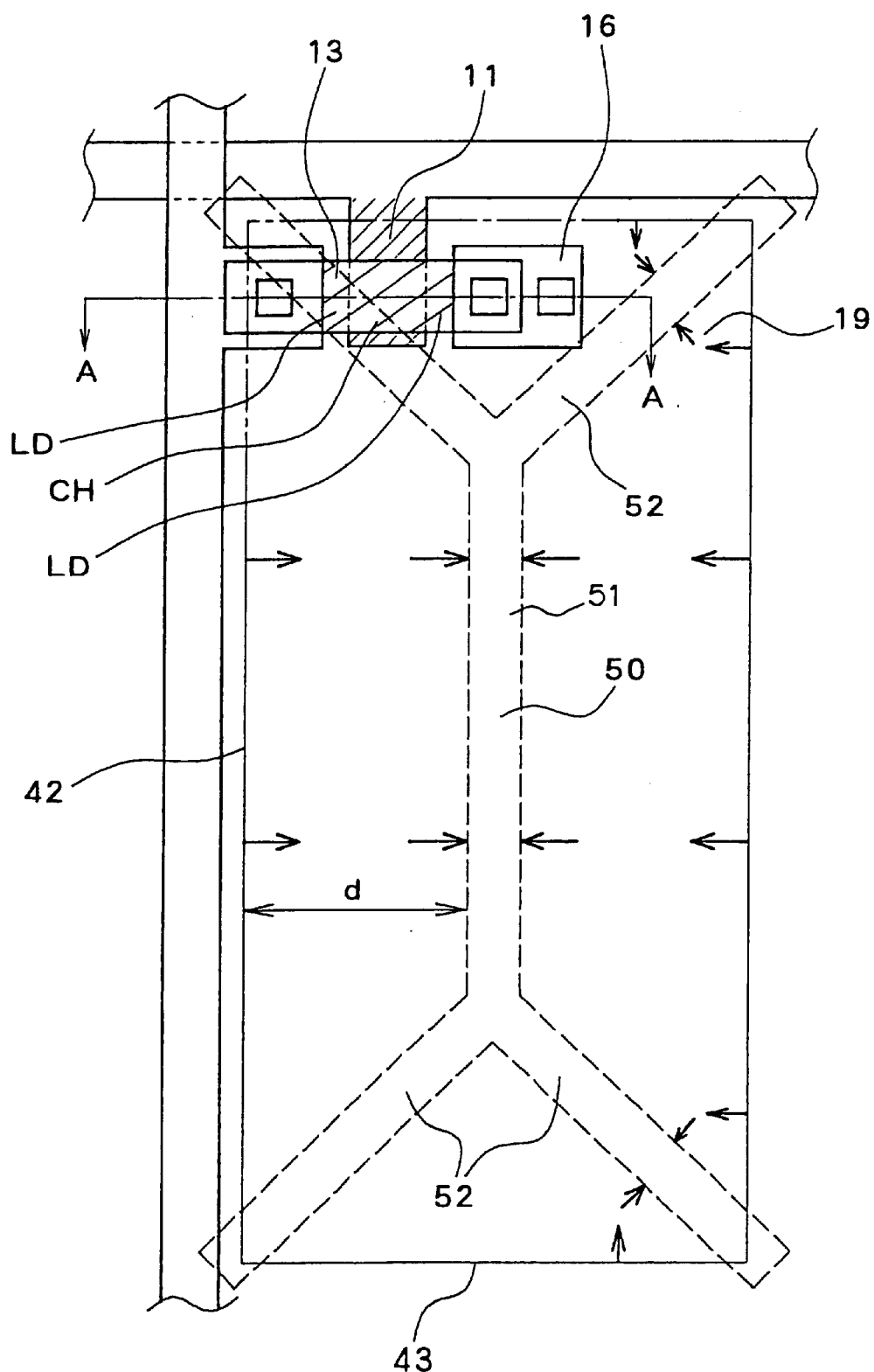
FIG. 1 is a plan view illustrating a configuration of one pixel of a liquid crystal display device.
Figure 2:
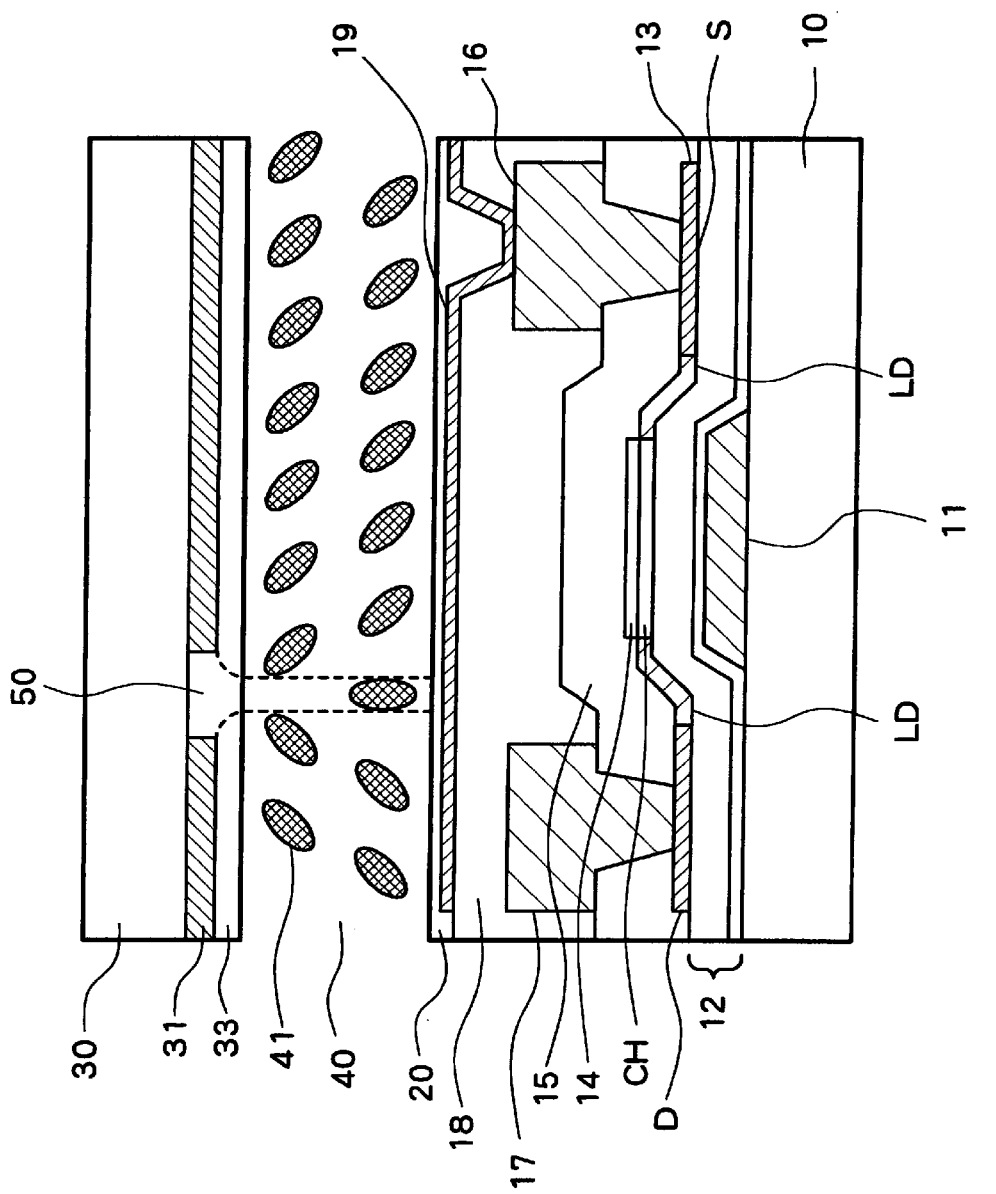
FIG. 2 is a cross sectional view taken along the line A—A in FIG. 1.

A preferred embodiment of the present invention will be described with reference to the accompanying drawings. FIGS. 1 and 2 illustrate in detail part of a configuration of a liquid crystal display device according to the present embodiment, especially a configuration for a pixel thereof. FIG. 1 is a plan view schematically showing one of a pair of substrates forming the liquid crystal display device, namely a first substrate having a TFT formed thereon. FIG. 2 is a cross sectional view of the liquid crystal display device taken along the line A—A in FIG. 1. On an insulating substrate 10 formed of glass or the like, a gate electrode 11 is formed of a metal, such as Cr, Ta, or Mo, and a gate insulating film 12 of SiNx and/or SiO$_2$ is formed covering the gate electrode 11. A polycrystalline silicon (p-Si) layer 13 patterned to cross over the gate electrode 11 is formed on the gate insulating film 12. Using an implantation stopper 14 formed of SiO$_2$ or the like on the layer 13 and patterned to the shape similar to the gate electrode 11, a (N–) lightly doped region LD including lightly doped impurities of P, As, or the like, and a (N+) source S and a (N+) drain region D, each including the same impurities heavily doped thereto and located outside the region LD, are formed. An intrinsic layer including substantially no impurities is formed directly under the implantation stopper 14, and serves as a channel region CH. Covering the p-Si layer 13 provided with such regions, an interlayer insulating film 15 is formed of, for example, SiNx. On the interlayer insulating film 15, a source electrode 16 and a drain electrode 17 are formed of Al, Mo, or the like, and connected to the source region S and the drain region D, respectively, through contact holes provided in the interlayer insulating film 15.

Covering the entire surface of the TFT configured as described above, a planarization insulating film 18 is formed of, for example, SOG (spin on glass), BPSG (boro-phospho silicate glass), or acrylic resin. A display electrode 19 for driving liquid crystal is formed of a transparent conductive film of ITO (indium tin oxide) or the like on the planarization insulating film 18 and connected to the source electrode 16 through a contact hole provided in the film 18.

A vertical orientation film 20 is formed by a macromolecular film, such as polyimide, to cover all the elements described above. In the present embodiment, the vertical orientation film 20 is of the rubbingless type. A second glass substrate 30 of glass or the like forming a pair with the substrate 10 is disposed opposite to the substrate 10 with the liquid crystal layer interposed therebetween. On this glass substrate 30, a common electrode 31 of ITO is provided over the entire display portion. An orientation film 33 of polyimide or the like similar to the orientation film 20 of the first substrate 10 is formed on the common electrode 31.

An orientation control window 50 is formed in the common electrode 31 as a slit penetrating the thickness of the electrode. As indicated by the broken line in FIG. 1, the planar shape of the orientation control window 50 is a combination of a linear portion 51 formed as a linear slit and a V-shaped portion 52 formed as a V-shaped slit and coupled to either end of the linear portion 51. In other words, each end of the linear slit is branched in the V shape. The linear portion 51 of the orientation control window extends substantially in parallel to a longer side 42 of the rectangular display electrode 19, and is located substantially at the center with respect to a shorter side 43. The tip of the V-shaped portion 52 is located at the position of the common electrode 31 facing the vertex of the rectangular display electrode 19.

As the opposite electrode is not provided immediately under the orientation control window 50 as illustrated in FIG. 2, an electric field strong enough to cause inclination of a liquid crystal molecule 41 is not generated in such a region. Consequently, the liquid crystal molecules 41 maintain the initial state of orientation, i.e. the state in which the molecules are aligned substantially perpendicularly to the electrodes 19 and 31. On the other hand, near the edges of the orientation control window 50, an electric field is formed in the direction indicated by the broken line in FIG. 2, i.e. in the direction converging toward the portion immediately under the opening of the common electrode (the orientation control window 50) and running in parallel toward the display electrode. Because the liquid crystal molecules 41 have negative dielectric anisotropy in the present embodiment, when the electric field is generated, the liquid crystal molecules 41 located in the vicinity of the orientation control window 50 are controlled such that their longer axis is oriented orthogonal to the electric field, i.e. the liquid crystal molecules in the vicinity of the orientation control window 50 are aligned in the inverted "V" shape, as shown in FIG. 2. Because an electric field is similarly formed in the oblique direction in the vicinity of the edges of the display electrode 19 toward the gap in the display electrode 19, the molecules are controlled to be oriented in the V shape as illustrated in FIG. 2. Such inclinations of the liquid molecules 41 in the vicinity of the edges of the common electrode 31 and the display electrode 19 are propagated to the interior of liquid crystal due to the continuous property thereof. Thus, the liquid crystal molecules 41 controlled as described above are oriented in a plurality of directions (four directions in this example) in a pixel as indicated by the arrows in FIG. 1 with the orientation control window 50 as the boundary.

Next, description will be given of orthogonal projections of the display electrode 19 and the orientation control window 50 onto the display plane of the present display device or a plane parallel thereto, i.e. onto a plane parallel to the plane where the display electrode 19 or the common electrode 31 is disposed. A distance d between the longer side 42 of the projection of the display electrode 19 and the edge of the projection of the linear portion 51 of the orientation control window influences the response speed of the liquid crystal. When an electric field is applied, the liquid crystal molecules 41 are inclined from the normal line direction of the plane such that the longer axis runs perpendicularly to the electric field in accordance with the strength of the electric field, but the azimuth of inclination is not determined by the strength of the electric field. In the present embodiment, the azimuth of inclination is determined by that of the liquid crystal molecules 41 resulting from the oblique electric field generated in the vicinity of the edges of the orientation control window 50 and the display electrode 19 described above. More specifically, when the liquid crystal molecules 41 in the vicinity of the above-described edges are inclined in a predetermined azimuth due to the oblique electric field, such an inclination is propagated toward the inner portion of the electrode. As the propagated distance decreases, the response speed of the liquid crystal increases. In other words, such an orientation that would minimize the imaginary line linking the longer axes of the liquid crystal molecules 41 when they drop to 180 degrees is preferable.

Figure 3:
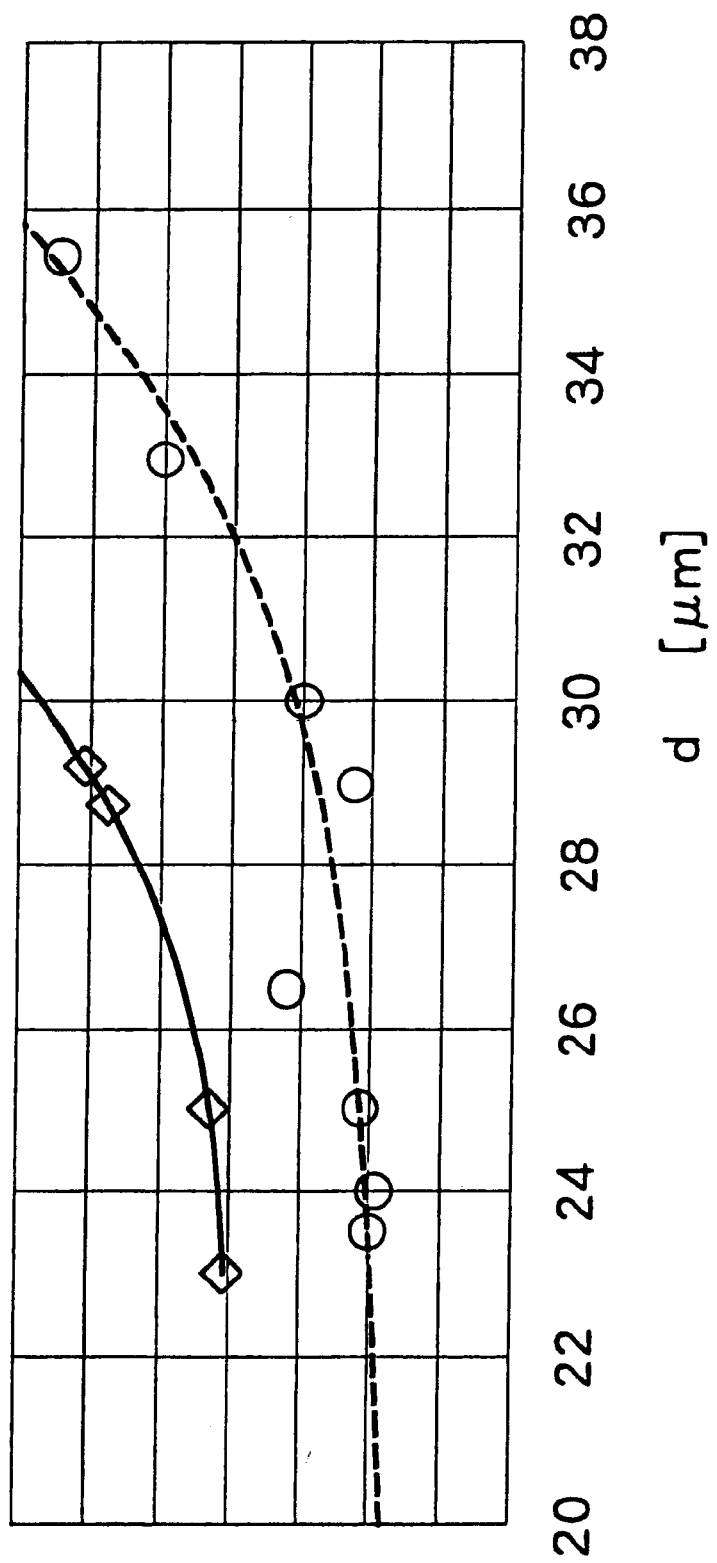
FIG. 3 is a graph plotting the response speed as a function of a distance d on a display plane between the edge of a linear portion of an orientation control window and a longer side of a display pixel.

FIG. 3 shows a relation ship between the distance d and the response speed. In the graph, the broken line indicates the response speed when the gap between the display electrode 19 and the common electrode 31, i.e. the cell gap, ranges from 3.3 $\mu$m to 3.4 $\mu$m, while the solid line indicates the speed when the cell gap ranges from 3.5 $\mu$m to 3.6 $\mu$m. Generally, the response speed of liquid crystal increases as the cell gap of the liquid crystal display device is reduced, and this is also demonstrated in FIG. 3 where the response speed of the liquid crystal is higher with the cell gap of 3.3–3.4 $\mu$m than that with the cell gap of 3.5–3.6 $\mu$m. However, as can be seen from FIG. 3, for the liquid crystal display device of the vertical alignment type according to the present embodiment, not only does such a general tendency apply, but also the response speed tends to increase as the distance d is reduced with either cell gap. Further, such an increase is small when the distance d is 30 $\mu$m or shorter, and substantially no improvement in response speed can be achieved when the distance d is 25 $\mu$m or shorter. The properties shown in FIG. 3 are obtained with use of a negative fluorine type liquid crystal having a viscosity of 150 mPa·sec, optical anisotropy $\Delta$n of 0.091, dielectric anisotropy $\Delta\epsilon$ of −3.8, and NI point (the temperature at which liquid crystal turns into liquid) of 82° C. While liquid crystal applicable to the present embodiment is not limited to that with the above-described properties, the relationship between the response speed of liquid crystal and the distance d between the window and the side of the display electrode as illustrated in FIG. 3 is established at least with the liquid crystal having similar properties or exhibiting similar characteristics. When the cell gap is 3.5–3.6 $\mu$m, the reduction in response speed is diminished with the distance d of 30 $\mu$m or shorter, and the response speed is substantially unchanged with the distance d of 25 $\mu$m or shorter. Further, when the cell gap is 3.3–3.4 $\mu$m, the effect of reducing the response speed is diminished with the distance d of 30 $\mu$m or shorter, and such an effect is very slight with the distance d of 25 $\mu$m or shorter.

The area where orientation of the liquid crystal molecules can be controlled, i.e. the area of display electrode 19 excluding the orientation control window 50, is substantially equal to the practical display area of a pixel. Consequently, a larger area is preferably provided for this area, and therefore it is preferable to have a longer distance d from this surface. As a result, the distance d is preferably longest in the range of values for which the effect of reducing the response speed cannot be expected, and is thus set to 25 $\mu$m to 30 $\mu$m in the present embodiment.

The width of the orientation control window 50 is preferably about 7 $\mu$m for the following reason. As described above, the orientation control window 50 is formed by providing an opening in the common electrode 31 in the pattern indicated by the dotted line in FIG. 1. Since no electric field is applied to the liquid crystal located immediately under the window, the window area is a non-display area. While the display area of the pixel can therefore be increased by providing the window 50 with a width smaller than 7 μm, the orientation partitioning (dividing) function cannot be fully exerted with such a width. On the other hand, a width larger than 7 μm does not substantially change the orientation partitioning function but decreases the display area of the pixel.

Figure 4:
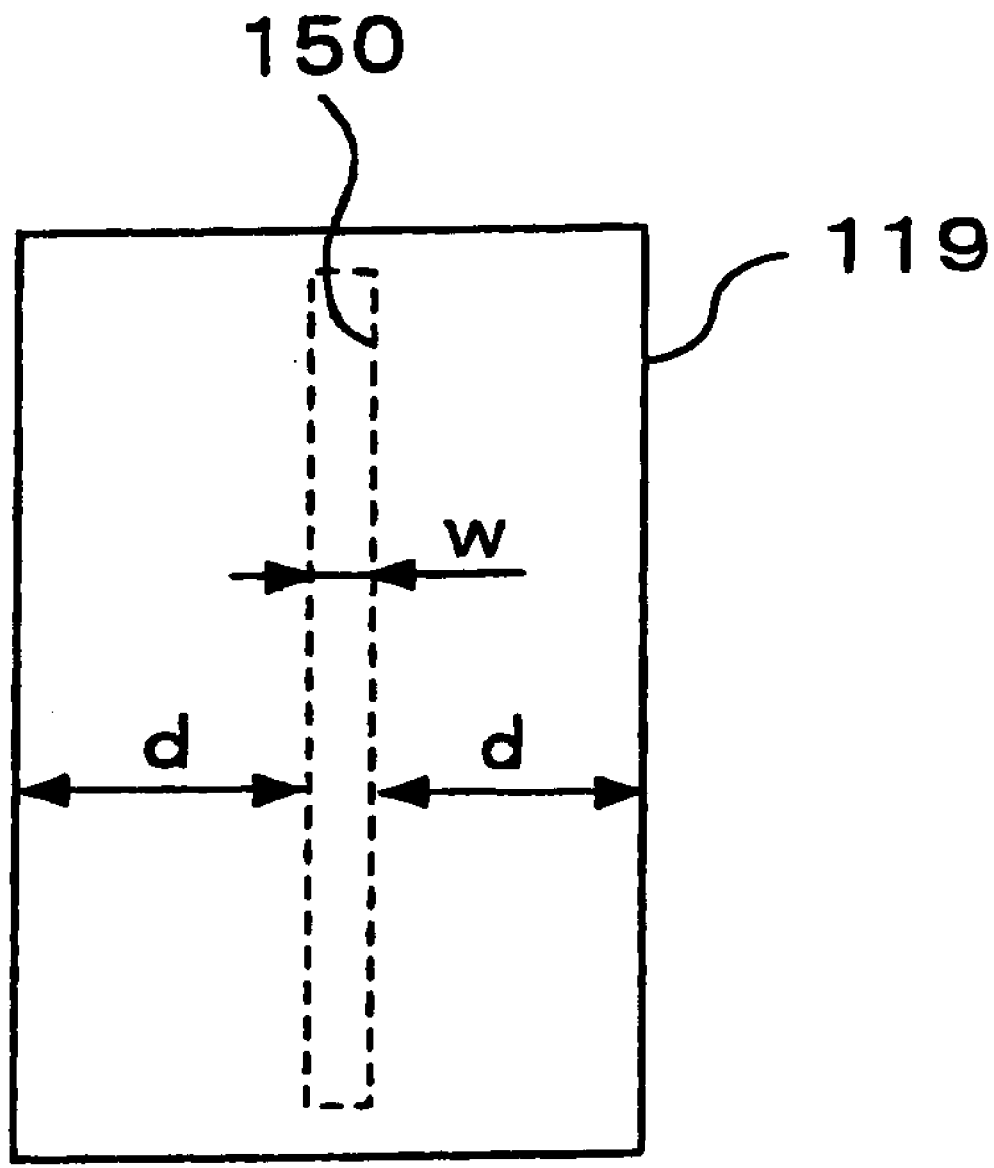
FIG. 4 illustrates another exemplary shape of the orientation control window.

FIG. 4 shows an example of another orientation control window in a different shape. A display electrode 119 is substantially rectangular in shape, and an orientation control window 150 having a width of approximately 7 μm is provided as a substantially rectangular slit extending substantially parallel to the longer side of the rectangular electrode 119 and located at the center with respect to the shorter side. The distance d between the edge of the orientation control window 150 and the longer side of the display electrode 119 is set to 25 μm to 30 μm. Alternatively, the orientation control window can be disposed parallel to the shorter side of the rectangular display electrode, in which case the distance between the shorter sides of the two elements is set to 25 μm to 30 μm.

Figure 5:
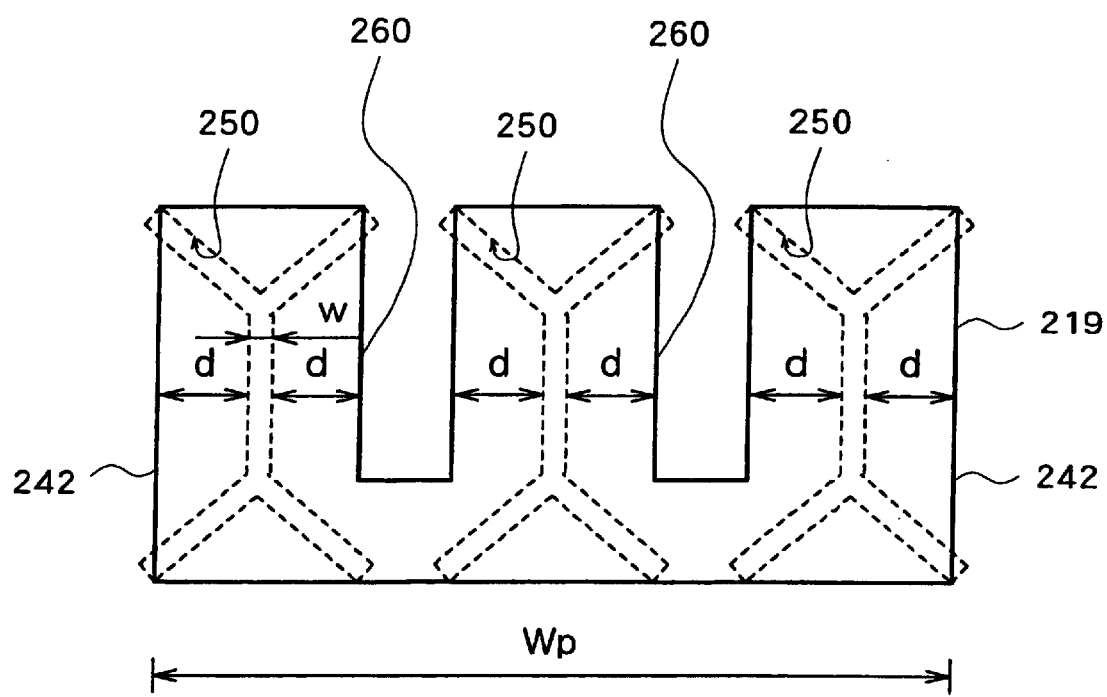
FIG. 5 illustrates another exemplary shape of the display electrode and arrangement of the orientation control window corresponding to such a display electrode.

FIG. 5 shows another exemplary arrangement of the orientation control window and the display electrode. A display electrode 219 is partitioned into 3 areas by a slit 260 in a rectangular shape, and an orientation control window 250 is provided for each area. Each orientation control window 250 is formed by a linear portion branched at each end, similarly to the orientation control window 50 illustrated in FIG. 1. The distance d between the edge of the display electrode 219, i.e. either the edge of an outer side 242 of the display electrode or that of the slit 260, and the edge of the linear portion of the orientation control window 250, is set to 25 μm to 30 μm. The widths of the window 250 and the slit 260 are both approximately 7 μm. While the slit 260 is provided in the display electrode 219, it also has the orientation partitioning function, similarly to the window 250, for controlling the azimuth of inclination of liquid crystal to approximately 180 degrees with the slit 260 as the boundary.

By thus providing a slit in the display electrode for one pixel and a plurality of orientation control windows per pixel, the present invention can be applied to a pixel having a larger width Wp. When the distance d is 25 μm to 30 μm and a width Ws of the slit is 7 μm, a pixel having a width Wp ranging from 185 μm to 215 μm can be handled by dividing the display electrode for a pixel into three as illustrated in FIG. 5. When the display electrode for a pixel is not divided as illustrated in FIGS. 1 and 4, the invention can be applied to the pixel having the width Wp of 57 μm to 67 μm. When the display electrode for a pixel is divided into two, the pixel having the width Wp of 121 μm to 141 μm can be handled. As described above, the present invention ensures partitioning of orientations of the liquid crystal molecules in a pixel, high-speed response, and improvement in aperture ratio, even when the pixel has a large width Wp. As a result, an LCD with excellent display quality can be implemented by applying the invention to, for example, a large sized LCD having a large pixel.

Figure 6:
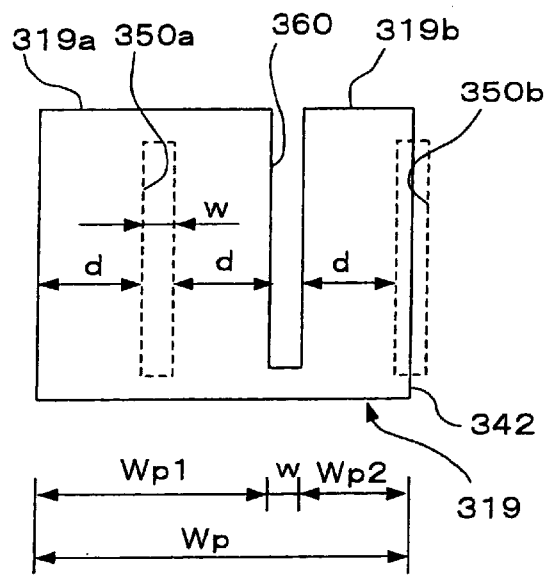
FIG. 6 illustrates a further exemplary shape of the display electrode and arrangement of the orientation control window corresponding to such a display electrode.
Figure 7:
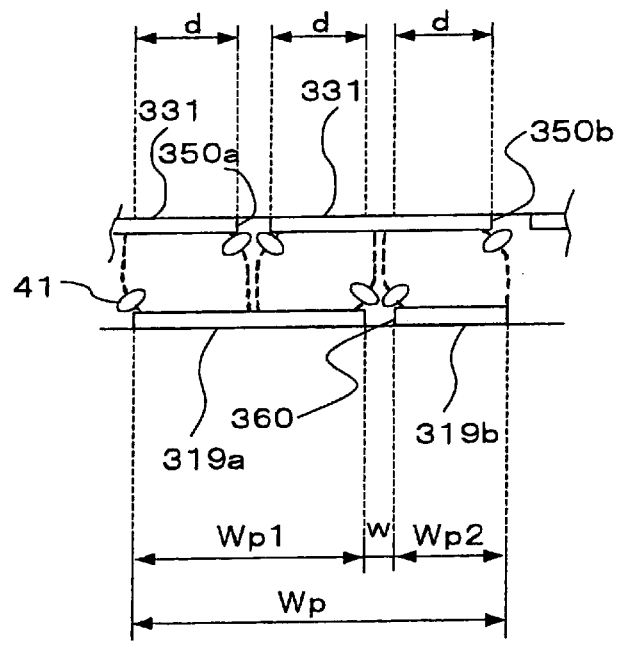
FIG. 7 is a cross sectional view of a liquid crystal display device employing the display electrode shown in FIG. 6.

Further, for a pixel whose width Wp is between the above ranges, an electrode configured as illustrated in FIGS. 6 and 7 can be employed. FIG. 6 is a plan view illustrating a display electrode 319 for one pixel and orientation control windows 350a and 350b provided in a common electrode 331, and FIG. 7 is a cross sectional view illustrating a plane orthogonal to the display electrode 319 and the common electrode 331. The display electrode 319 is divided into two segments 319a and 319b by a slit 360 extending substantially parallel to the orientation control windows 350a and 350b. The segment 319b has a width Wp2 substantially half as long as a width Wp1 of the segment 319a, and its area is also substantially half as large as the segment 319a.

The orientation control window 350a is provided at a position corresponding to the approximate center of the segment 319a with respect to its width Wp1. Similarly to the above-described example, the distance d between the edge of the orientation control window 350a and either side of the segment 319a of the display electrode substantially parallel to the orientation control window is set to 25 μm to 30 μm. For the other segment 319b of the display electrode, the orientation control window 350b is provided at a position facing an outer side 342 of the display electrode 319, i.e. the outer side of the pixel. The distance d between the edge of the orientation control window 350b and the edge of the slit 360 is also set to 25 μm to 30 μm.

Electric fields are generated as indicated by the broken lines in the cross sectional view of FIG. 7, and the orientation of the liquid crystal molecules 41 are aligned in each of the three segments divided by the orientation control window 350a and the slit 360, as shown in the figure. When the distance d is 25 μm to 30 μm, and the widths of the slit and the orientation control window are 7 μm in such a configuration, the pixel width Wp will be 93 μm to 108 μm, so that the present invention can be applied to pixels with an even wider variety of widths. For a pixel having such a width (for example, 68 μm to 92 μm) that does not allow implementation of the invention with the above-described configuration, the present invention can be varied by increasing the width w of the slit and the orientation control window at the sacrifice of a slight reduction in the aperture ratio.

What is claimed is:

1. A liquid crystal display device of a vertical alignment type comprising a liquid crystal layer having liquid crystal molecules vertically aligned between a plurality of display electrodes and a facing electrode, the orientation of said liquid crystal molecules being controlled by an electric field, wherein said facing electrode has an orientation control window formed by providing an opening in a predetermined shape in said facing electrode, and a distance between an edge of said display electrode and an edge of said orientation control window on orthogonal projections to a display plane is 25 μm to 30 μm at most.

2. The liquid crystal display device according to claim 1, wherein the dielectric anisotropy of said liquid crystal molecules is approximately −3.8.

3. The liquid crystal display device according to claim 1, wherein said orientation control window has a width of approximately 7 μm.

4. The liquid crystal display device according to claim 1, wherein said orientation control window has a substantially linear portion substantially parallel to a side of said display electrode, and a distance between said side of said display electrode substantially in parallel to said linear portion of said orientation control window and an edge of said linear portion of said orientation control window on orthogonal projections to the display plane is 25 μm to 30 μm.

5. The liquid crystal display device according to claim 4, wherein the dielectric anisotropy of said liquid crystal molecules is approximately −3.8.

6. The liquid crystal display device according to claim 4, wherein said orientation control window has a width of approximately 7 µm.

7. The liquid crystal display device according to claim 1, wherein said orientation control window has a linear portion and a V-shaped portion coupled to and branched from each end of the linear portion, and a distance between a side of said display electrode substantially parallel to said linear portion of said orientation control window and an edge of said linear portion of said orientation control window on orthogonal projections to the display plane is 25 µm to 30 µm.

8. The liquid crystal display device according to claim 7, wherein the dielectric anisotropy of said liquid crystal molecules is approximately −3.8.

9. The liquid crystal display device according to claim 7, wherein said orientation control window has a width of approximately 7 µm.

10. A liquid crystal display device of a vertical alignment type comprising a liquid crystal layer having liquid crystal molecules vertically aligned between a plurality of display electrodes and a facing electrode, the orientation of said liquid crystal molecules being controlled by an electric field, wherein said display electrode is divided into a plurality of segments by a linear slit, said facing electrode has an orientation control window formed by providing an opening in said facing electrode, the orientation control window having a linear portion substantially parallel to said slit, and a distance between said slit of said display electrode and an edge of said linear portion of said orientation control window substantially parallel to said slit on orthogonal projections to the display plane is 25 µm to 30 µm.

11. The liquid crystal display device according to claim 10, wherein the dielectric anisotropy of said liquid crystal molecules is approximately −3.8.

12. The liquid crystal display device according to claim 10, wherein said orientation control window has a width of approximately 7 µm.

13. The liquid crystal display device of a vertical alignment type comprising a liquid crystal layer having liquid crystal molecules vertically aligned between a plurality of display electrodes and a facing electrode, the orientation of said liquid crystal molecules being controlled by an electric field, wherein said display electrode is divided into a plurality of segments by a linear slit, and an end segment located at an end among said plurality of segments has an area smaller than any other segments, said facing electrode has an orientation control window which is a cutout having a linear portion substantially parallel to said slit and corresponding to each of the divided segments of said display electrode, a side, which is also an edge of said end segment of said divided display electrode and an edge of a pixel, overlaps a corresponding orientation control window, a distance between the other edge of said end segment and an edge of said linear portion of said orientation control window on orthogonal projections to the display plane being 25 µm to 30 µm, and for the remaining segments of said display electrode, a distance between either of two sides of said segments substantially parallel to said slit and an edge of said linear portion of said orientation control window substantially parallel to the slit on orthogonal projections to the display plane is 25 µm to 30 µm.

14. The liquid crystal display device according to claim 13, wherein the dielectric anisotropy of said liquid crystal molecules is approximately −3.8.

15. The liquid crystal display device according to claim 13, wherein said orientation control window has a width of approximately 7 µm.

\* \* \* \* \*